United States Patent [19]

Liljedahl

[11] Patent Number: 4,563,118
[45] Date of Patent: Jan. 7, 1986

[54] EXPANDING MEANS

[76] Inventor: Gunnar Liljedahl, Alvik 7555, Luleå, Sweden, S-951 90

[21] Appl. No.: 662,541

[22] Filed: Oct. 19, 1984

Related U.S. Application Data

[63] Continuation of Ser. No. 347,318, Feb. 9, 1982, abandoned.

[51] Int. Cl.⁴ .............................................. F16B 13/04
[52] U.S. Cl. ........................................ 411/34; 411/71
[58] Field of Search ...................... 411/34, 35, 36, 37, 411/38, 71, 72, 73; 248/336, 337

[56] References Cited

U.S. PATENT DOCUMENTS

| 829,892 | 8/1906 | Rieflin | 248/337 |
| 2,120,577 | 6/1938 | Schulte | 411/73 X |
| 2,456,480 | 12/1948 | Austin | 411/34 X |
| 2,542,967 | 2/1951 | Waechter | 411/34 X |
| 3,504,498 | 4/1970 | Triplett | 411/34 |
| 3,651,651 | 3/1972 | Triplett | 411/34 |
| 4,108,043 | 8/1978 | Varga | 411/34 |
| 4,360,301 | 11/1982 | Mosberger | 411/73 X |

FOREIGN PATENT DOCUMENTS

| 189899 | 5/1957 | Austria | 411/34 |
| 207543 | 2/1960 | Austria | 411/34 |
| 1941148 | 2/1971 | Fed. Rep. of Germany | 411/73 |
| 1500990 | 7/1973 | Fed. Rep. of Germany | 411/71 |
| 2504753 | 8/1975 | Fed. Rep. of Germany | 411/71 |
| 990103 | 5/1951 | France | 411/34 |
| 1312011 | 11/1962 | France | 411/37 |
| 774002 | 5/1957 | United Kingdom | 411/34 |
| 907899 | 10/1962 | United Kingdom | 411/38 |

Primary Examiner—Kenneth J. Dorner
Assistant Examiner—Adrian H. Whitcomb, Jr.
Attorney, Agent, or Firm—Holman & Stern

[57] ABSTRACT

An expanding means for removable fastening in a cylindrical hole, consisting of an elastic cylinder, which is caused by axial contraction to radially expand and with the outer surface to engage with the cylindrical hole, which cylinder is formed with a plurality of bars, which extend substantially in the axial direction of the cylinder from grooves running in the direction of the bars in the outer surface of the cylinder and radially outwardly outside the outer surface to frictionally grip the inside of the cylindrical hole so that the elastic cylinder is prevented from rotating during contraction.

1 Claim, 2 Drawing Figures

EXPANDING MEANS

This is a continuation of application Ser. No. 347,318 filed Feb. 9, 1982 and now abandoned.

BACKGROUND OF THE INVENTION

1. Field of the Invention

This invention relates to an expanding means for removable fastening in a cylindrical hole, consisting of an elastic cylinder, which is caused by axial contraction to expand and with its outer surface to engage with the cylindric hole, and which is formed with a plurality of bars extending substantially in the axial direction of the cylinder.

2. Description of the Prior Art

The invention is substantially intended to be used for locking in an axial direction two members co-acting in a telescopic manner relative to one another. It is a known problem that the expanding movement properly can be carried out only with difficulty when the expanding means is positioned within the outer one of two such members due to the fact that the operator by using tools or the like has difficulties in controlling said expanding movement. This control, for example, may imply that the expanding means must be turned relative to a screw located within the expanding means and controlling the same. It is also known to use or attach on the outer surface of the expanding means a friction-increasing means so as with friction to abut the outer surface of the two telescopically co-acting members to such an extent, that the expanding means is prevented from turning, whereby it is possible to effect the axial contraction by turning a screw located within the expanding means.

BRIEF SUMMARY OF THE INVENTION

Heretofore, however, no such friction-increasing means are known in the art which ensure a sufficient friction for effecting a satisfactory contraction or, rather, to bring about by the expanding means an initial contraction in the axial direction which is sufficiently strong to effect a safe fastening in the axial direction. It was found that the invention is particularly suitable for use in the adjustment of two telescopically co-acting members, for example, the length of a crutch, stick or the like. The characterizing features of the invention as defined in the attached claims solve the problem of rapidly and safely carrying out the expanding of the expanding means in such a way, that the expanding means safely can be fixed against axial movement in a cylindrical hole.

BRIEF DESCRIPTION OF THE DRAWINGS

An embodiment of the invention is described in the following, with reference to the accompanying drawing, in which.

DETAILED DESCRIPTION OF THE INVENTION

Figure 1:
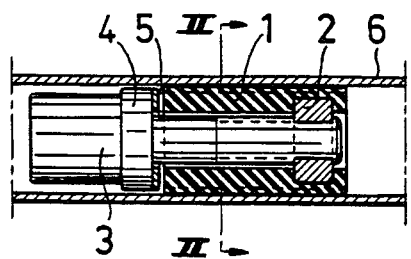
FIG. 1 is an axial cross-sectional view through the expanding means and associated screw member.

The expanding means consists of an elastic cylinder 1 of rubber or similar material. At its right-hand end in FIG. 1, the cylinder includes an internally threaded piece 2. A screw 3 extends with one end through the hole through the cylinder and threadedly engages with the threaded piece 2. A shoulder 4 of the screw 3 abuts the left-hand end of the elastic cylinder 1 via a friction-reducing washer 5. By turning the screw 3 relative to the elastic cylinder 1, the cylinder is contracted in the axial direction and expands.

The cylinder is positioned in a cylindrical pipe 6, which thus constitutes one member of two telescopically co-acting members. The second member can be regarded to be the screw 3, which per se can be a long rod inserted in the pipe 6.

The outer surface of the cylinder 1 comprises longitudinal bars 7, which extend from grooves 8 provided in the outer surface of the cylinder and project outward outside of the outer surface. Due to their extending from grooves in the outer surface, the bars 7 are allowed to fold in radial direction, i.e. to the side, when the cylinder is being turned. Hereby a key effect arises when the bar 7 places itself against an edge of the groove 8 and against the inner surface of the pipe 6. This establishes a safe fastening between the bars 7 and the inner surface of the pipe 6, i.e. the cylinder is safely retained against rotation in the pipe 6, whereby a relative turning between the screw 3 and the cylinder can be effected, without requiring the operator to hold the cylinder proper, but only the pipe 6 located on the outside. It should be understood that the expanding means can be used even if inaccessible for an operator as long as at least the screw can be turned by extension with a rod in the pipe 6 or the like.

Figure 2:
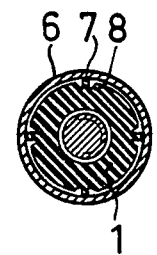
FIG. 2 is an end view seen from the right of FIG. 1.

The cylinder has been described above to comprise bars 7 and grooves 8 extending in purely axial direction. It is understood, however, that deviations from the purely axial direction may occur without thereby jeopardizing the function of the invention or abandoning the invention idea. The grooves 8, further, can be designed in a different manner, and in FIG. 2, for example, the sides of the grooves 8 are shown slightly inclined so that the openings of the grooves exceed in size the bottom of the grooves.

I claim:

1. A removable fastening device for locking together two telescoping cylindrical members, comprising in combination:
   (A) an outer tubular cylindrical member;
   (B) an inner cylindrical member telescopically inserted in said outer member; and
   (C) fastening means attached to the inserted end of said inner member for removably fastening said members to one another, said fastening means comprising:
   an elastic cylindrical tube having a plurality of circumferentially spaced axially extending grooves extending the entire length of its outer surface;
   an axially extending bar running the entire length of each groove integrally formed with said tube and projecting radially outwardly beyond the outer surface of the elastic tube in contacting engagement with the inner surface of said outer tubular member to prevent rotation of said elastic tube with respect to said outer tubular member, each bar projecting from substantially the central portion of each groove and having a smaller width than said groove to form axially extending spaces on opposite sides of said bar between said sides and the surface of said groove so that said bar is partly receivable in said spaces when the bar is flexed during use;

an internally threaded piece fixedly mounted within one end of said elastic tube adjacent said one end and axially inwardly thereof;

a shouldered screw threaded member rotatingly mounted coaxially within said elastic tube having an enlarged shoulder adjacent the other end of said tube, said screw threaded member threadingly engaging said threaded piece;

a friction-reducing washer positioned between said shoulder and said other end;

said screw threaded member being fixed to the inserted end of said inner cylindrical member, so that rotation of said inner member in one direction with respect to said outer tubular member draws said threaded piece and shoulder toward each other to axially compress and radially expand said elastic tube into fastening engagement with said outer member; and each bar having a radial height from the surface of said groove sufficient so that each bar always projects radially beyond the outer surface of said elastic tube when said tube is not fully radially expanded.

* * * * *